(12) United States Patent  
Takeda et al.

(10) Patent No.: US 7,766,484 B2  
(45) Date of Patent: Aug. 3, 2010

(54) STRUCTURE FOR COOLING A LAMP FOR A PROJECTION DISPLAY APPARATUS HAVING AN INTEGRATED EXHAUST DUCT

(75) Inventors: Mikiya Takeda, Tokyo (JP); Gou Karasuyama, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 537 days.

(21) Appl. No.: 11/545,627

(22) Filed: Oct. 11, 2006

(65) Prior Publication Data

US 2007/0115436 A1 May 24, 2007

(30) Foreign Application Priority Data

Nov. 18, 2005 (JP) ............... 2005-334148

(51) Int. Cl.
- G03B 21/16 (2006.01)
- G03B 21/14 (2006.01)
- G03B 21/22 (2006.01)
- B60Q 1/06 (2006.01)
- F21V 29/00 (2006.01)

(52) U.S. Cl. ............ 353/61; 353/119; 362/373
(58) Field of Classification Search ........... 353/61, 353/57, 58, 60, 119; 362/373, 298, 294, 362/245; 348/748; 352/202
See application file for complete search history.

(56) References Cited

U.S. PATENT DOCUMENTS 6,481,854 B1* 11/2002 Sugawara et al. ............. 353/52
6,494,581 B2* 12/2002 Shimizu ....................... 353/61
7,210,825 B2* 5/2007 Watanabe et al. ............ 362/373
7,367,679 B2* 5/2008 Emery ............................ 353/60
7,380,965 B2* 6/2008 Nakashita ..................... 362/373
7,510,285 B2* 3/2009 Takemi et al. ................. 353/61
2004/0169825 A1* 9/2004 Ozawa et al. ................. 353/61
2005/0117349 A1* 6/2005 Pinho et al. .................. 362/345
2005/0140935 A1* 6/2005 Shin ............................. 353/52
2005/0146688 A1 7/2005 Takemi

FOREIGN PATENT DOCUMENTS

| CN | 1344968 | 4/2002 |
|---|---|---|
| JP | 2001-92012 | 4/2001 |
| JP | 2001-256819 | 9/2001 |
| JP | 2004-14204 | 1/2004 |
| JP | 2005-31549 | 3/2005 |

OTHER PUBLICATIONS

Chinese Office Action dated Sep. 19, 2008 with English translation.

* cited by examiner

*Primary Examiner*—Georgia Y Epps  
*Assistant Examiner*—Ryan Howard  
(74) *Attorney, Agent, or Firm*—McGinn IP Law Group, PLLC (57) ABSTRACT

A structure for cooling a lamp used for a projection type display apparatus is provided. The structure comprises a lamp house for housing a lamp that is operable as a light source, said lamp house being configured to be installed in a housing of said projection display apparatus; and a fan for supplying cooling air into said lamp house. The lamp house comprises a removable lamp house cover, and an exhaust duct for said cooling air is integrated with said lamp house cover.

18 Claims, 7 Drawing Sheets

STRUCTURE FOR COOLING A LAMP FOR A PROJECTION DISPLAY APPARATUS HAVING AN INTEGRATED EXHAUST DUCT

The present application is based on, and claims priority from, J.P. Application No. 2005-334148, filed on Nov. 18, 2005, the disclosure of which is hereby incorporated by reference herein in its entirety.

BACKGROUND OF THE INVENTION

1. Field of the Invention

The present invention relates to a structure for cooling a lamp that is used for a projection display apparatus, and more particularly, to a structure for cooling a high-power lamp.

2. Description of the Related Art

With the reduction in size and improvement in performance of projection display apparatuses, which has been brought about through a rapid advance in liquid crystal technologies and DLP (Digital Light Processing; trademark) technologies, projection display apparatuses for projecting an image have been used in wider fields. The projection display apparatus is drawing attention as a front projector, which is a large projection display apparatus that is replacing conventional home-use television sets. The projection display apparatus has also been used for showing movies, as a digital cinema (DLP cinema) projector, because of the high resolution panel that enables the apparatus to project high-resolution images at full size.

Conventionally, a movie is displayed by projecting images stored in a video film onto a very large screen, for example, in a theater. Digital cinema is common to the conventional cinema in that images are projected and displayed on a very large screen. However, the digital cinema is different from the conventional cinema in that digital data are used for projection, instead of a film, and are projected onto a screen by a projection display apparatus, or by a digital cinema projector. The digital cinema largely differs from a front projector, which is used, for example, in a classroom or a conference room, in size, brightness, and reliability.

For example, a front projector typically employs an ultra-high pressure mercury lamp of approximately 300 W at the highest as a light source, whereas, a digital cinema projector requires a xenon lamp of 2 kW to 6 kW. Therefore, the amount of heat that is generated by a lamp and the size of a lamp, as well as danger, are incomparably larger than that of a front projector, and the entire size and the total weight of the apparatus also incomparably larger than that of a front projector.

Main parts of a xenon lamp that require cooling are a cathode, an anode, and a bulb. Conventionally, a fan is arranged on the backside of the cathode, and cooling air is supplied by the fan in a straight line along an optical axis of the lamp. As a result, the cathode, the bulb, and the anode are sequentially cooled. When the lamp is replaced, the xenon lamp itself is replaced with a new one. Japanese Patent Laid-Open Publication No. 2005-31549 discloses a structure for cooling a lamp, which has a heat sink for a xenon lamp, and two fans for cooling the xenon lamp.

According to another related art, a lamp house is provided to hold a xenon lamp therein, and the lamp is replaced by replacing the lamp house. The lamp is cooled by cooling air that is supplied toward the cathode, the anode, and the bulb from a direction perpendicular to the optical axis of the lamp.

Figure 1A:
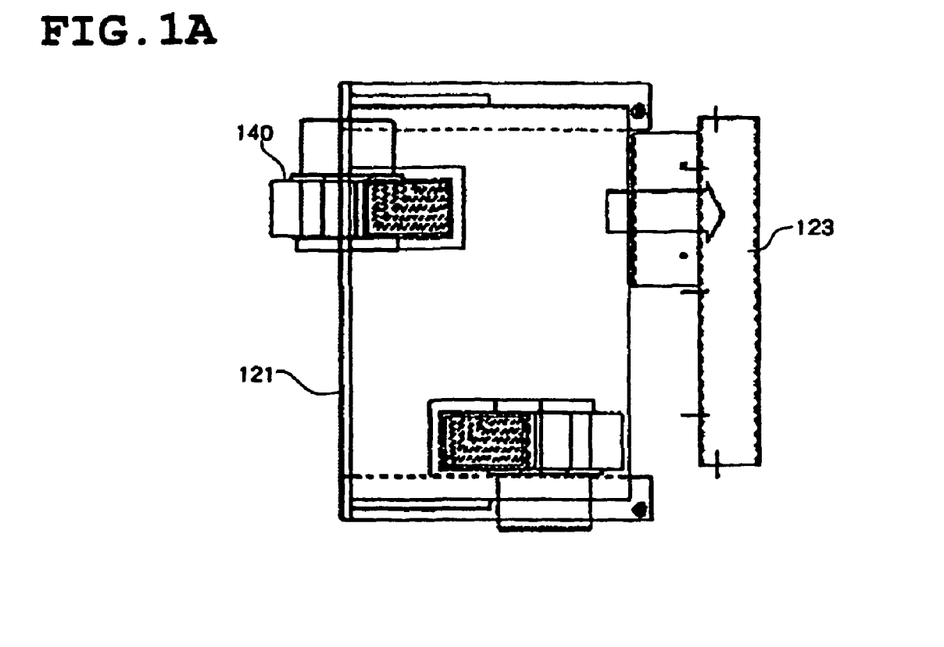
FIGS. 1A, 1B show a top plan view and a side view, respectively, for illustrating an exemplary structure of a lamp house used for a xenon lamp and an exhaust duct according to related art.
Figure 1B:
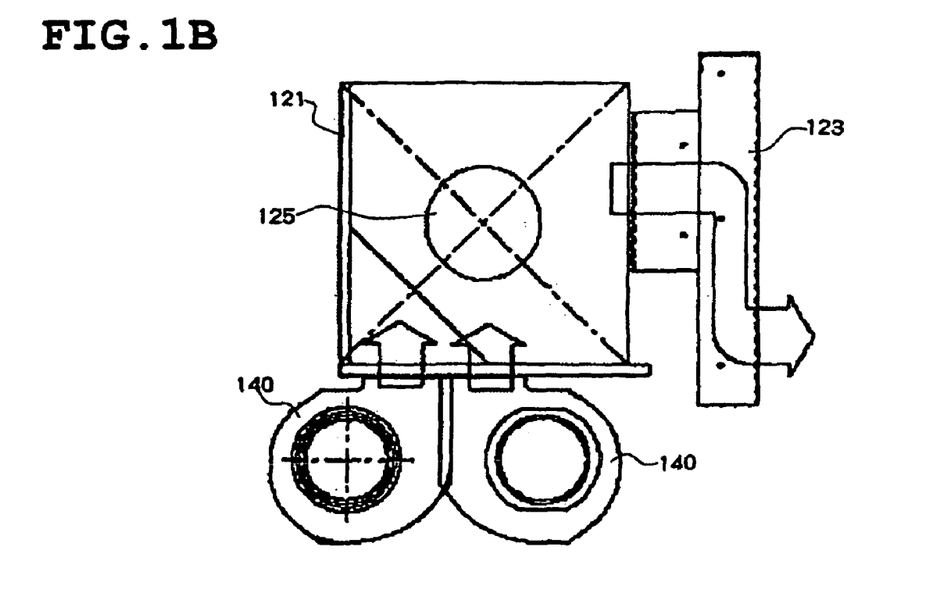

Referring to FIG. 1A, a lamp, not shown, is arranged in a lamp house such that an anode, a bulb, and a cathode of the lamp are aligned in this order in the top-to-bottom direction of the figure. Light is emitted to the outside through explosion-proof glass 125. A pair of sirocco fans 140 are provided on the bottom surface of lamp house 121 at the locations that correspond to the anode and cathode, respectively. Referring to FIG. 1B, cooling air is supplied into lamp house 121 via each intake port along the direction indicated by the arrows, and after cooling the lamp, is exhausted to the outside via exhaust duct 123, which is provided outside lamp house 121, along the direction indicated by the arrow.

In related art, there are some problems to be addressed. The first problem is how safety can be ensured when replacing a xenon lamp. The second problem is efficiency for cooling a xenon lamp. And the third problem is the size of a lamp house or the size of a projection display apparatus.

Each portion of a lamp can be cooled by supplying cooling air straight along an optical axis of the lamp. However, an anode, which is located downstream of a double reflector for a bulb, cannot be sufficiently cooled according to this method because the double reflector has a large diameter. Also, because a xenon lamp needs to be replaced as a whole and because it is mounted in a congested area in the main body of a projection display apparatus, additional effort is required to replace the xenon lamp. Therefore, it is not recommended that a user replace a xenon lamp by himself, and replacement work is only performed by those who have training and are qualified by a certifying authority. Therefore, there are needs for improvement of safety and easy replacement.

In related art concerning lamp houses, exhaust duct 123 is connected to lamp house 121 at the outside of lamp house 121, as illustrated in FIGS. 1A, 1B. Cooling air that enters lamp house 121 from the lower side of lamp thereof remains stagnant in lamp house 121 after it cools the corresponding electrodes, and is not efficiently exhausted. Thus, there is a limitation for improving cooling efficiency. Further, since the cooling air is supplied to the cathode and the anode along a direction that is perpendicular to the optical axis of the lamp, a sufficient amount of cooling air cannot be supplied to the bulb, which makes it particularly difficult to efficiently cool the bulb and to properly control the cooling (temperature setting). Also, the structure in which the exhaust duct is arranged outside the lamp house causes an additional increase in the outer dimensions of a projection display apparatus.

When a xenon lamp is replaced, a lamp house that houses a xenon lamp needs to be removed from the projection display apparatus because the xenon lamp is integrated with the lamp house. This operation requires opening a side panel of the lamp house, and therefore, needs a larger number of steps. Further, care must be taken to ensure safety during replacement of a lamp, because the size of the opening on the side of the lamp house is limited.

SUMMARY OF THE INVENTION

It is an object of the present invention to provide a structure for cooling a lamp used for a projection display apparatus, which is compact and allows easy removal of a lamp from a lamp house, and which is capable of uniformly cooling each part of the lamp while preventing cooling air from remaining in the lamp house.

According to the present invention, a structure for cooling a lamp used for a projection type display apparatus is provided. The structure comprises a lamp house for housing a lamp that is operable as a light source, said lamp house being configured to be installed in a housing of said projection display apparatus; and a fan for supplying cooling air into said lamp house. The lamp house comprises a removable lamp house cover, and an exhaust duct for said cooling air is integrated with said lamp house cover.

Since the exhaust duct is integrated with the lamp house cover, a large inlet area can be easily ensured for the duct, and a reduction in the size of the structure is also easy.

By providing two intake ports for cooling air on the lamp house at locations near the anode and cathode, and by independently cooling the anode and the cathode by means of two fans having an adjustable flow rate, cooling air is efficiently supplied.

By providing a pair of inlet openings that are formed on the exhaust duct which is on the lamp house cover at locations near the anode and the cathode of the lamp, respectively, cooling efficiency is increased because the cooling air is easily exhausted from the exhaust duct without staying stagnant in the lamp house. By providing the openings near the anode and the cathode of the lamp, respectively, the duct itself can be accommodated in the lamp house, contributing to a reduction in size of the projection display apparatus.

Further, by forming the inlet openings of the duct portions such that the inlet openings have different opening areas, a larger amount of air tends to enter the opening having a larger opening area. Therefore, part of the cooling air that is introduced to the side of the opening having a smaller opening area tends to flow toward the opening having a larger opening area via the bulb of the lamp, leading to an increased efficiency in cooling the bulb.

Further, since the lamp house cover is fixed to the removable lid which constitutes the back surface of the housing of the projection display apparatus, the lamp house cover, which is provided with the exhaust duct, is removed together with the lid by removing the lid from the housing. Therefore, the sides of the lamp house are opened to the outside and a large space is ensured for replacing the lamp.

Since the exhaust duct for cooling air is integrated with the removable lamp house cover on the inside of the lamp house cover, a large opening area is ensured for the inlet opening of the exhaust duct. Therefore, cooling efficiency, as well as control of air flow rate, can be improved. In addition, a reduction in size of the structure for cooling the lamp can be achieved because the exhaust duct is arranged inside the lamp house.

Further the lamp house cover is fixed to the removable lid, which constitutes the back surface of the housing of the projection display apparatus, and the lamp house cover is configured to be engaged with the lamp house when the lid is engaged to the housing. Therefore, the lamp house cover, which is provided with the exhaust duct, is removed together with the lid by removing the lid from the housing. Thus, the sides of the lamp house are opened to the outside and a large space is ensured for replacing the lamp.

The above and other objects, features, and advantages of the present invention will become apparent from the following description with reference to the accompanying drawings which illustrate examples of the present invention.

BRIEF DESCRIPTION OF THE DRAWINGS

FIGS. 9A-9C are schematic diagrams illustrating the structure for cooling a lamp according to the embodiment of the present invention, wherein

DETAILED DESCRIPTION OF THE INVENTION

A projection display apparatus having a structure for cooling a lamp according to an exemplary embodiment of the present invention will be described with reference to the drawings. A xenon lamp is used in the following embodiment because a xenon lamp is preferable as an example for describing the solution of the problems which are mentioned above, i.e., the problem of how safety can be improved when replacing a lamp, the problem of how to efficiently cool a lamp, and the problem of the size of a lamp house or a projection display apparatus itself, as described above. However, the present invention is not limited to a xenon lamp, and can be applied to any light source lamp used for a projection display apparatus, such as a high-pressure mercury lamp, as long as a lamp is provided with an anode and a cathode in front and at the back of a bulb.

Figure 2:
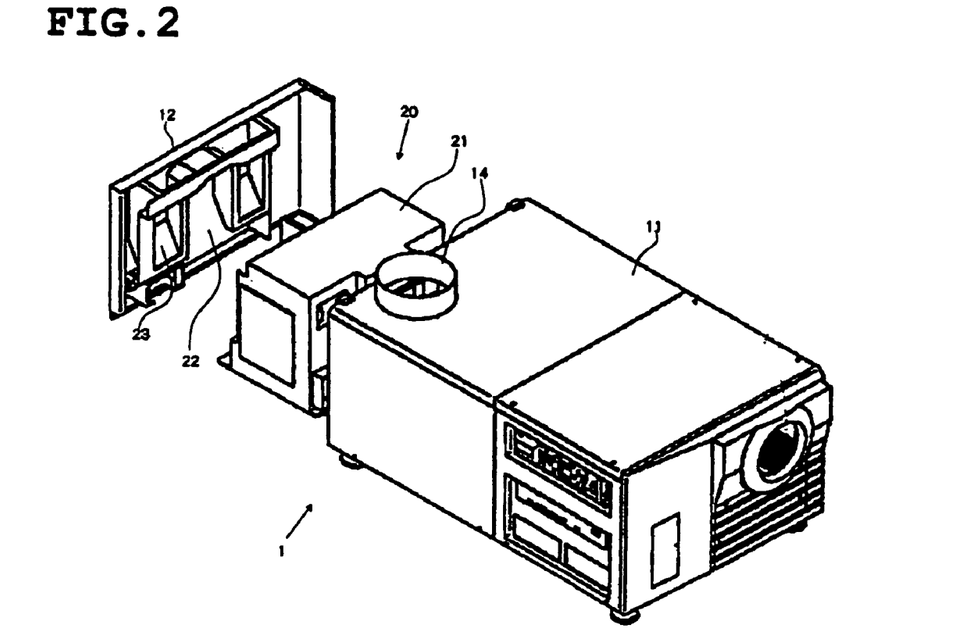
FIG. 2 is a partially exploded perspective view schematically illustrating a projection display apparatus according to an exemplary embodiment of the present invention, viewed from the side of a projection lens.
Figure 3:
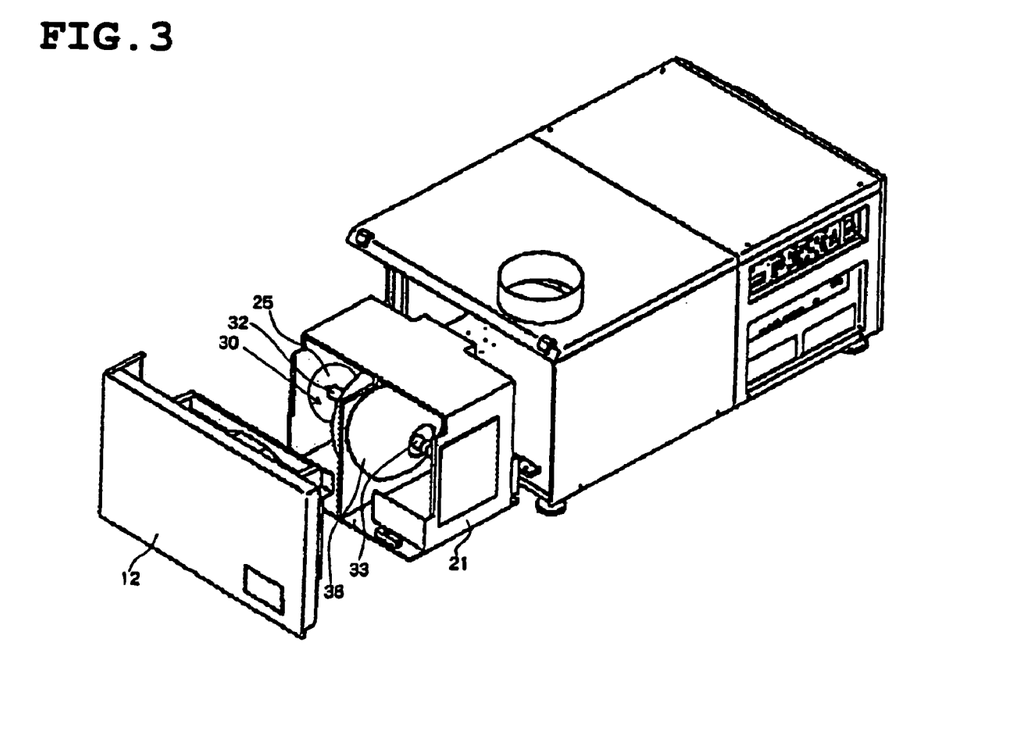
Figure 4:
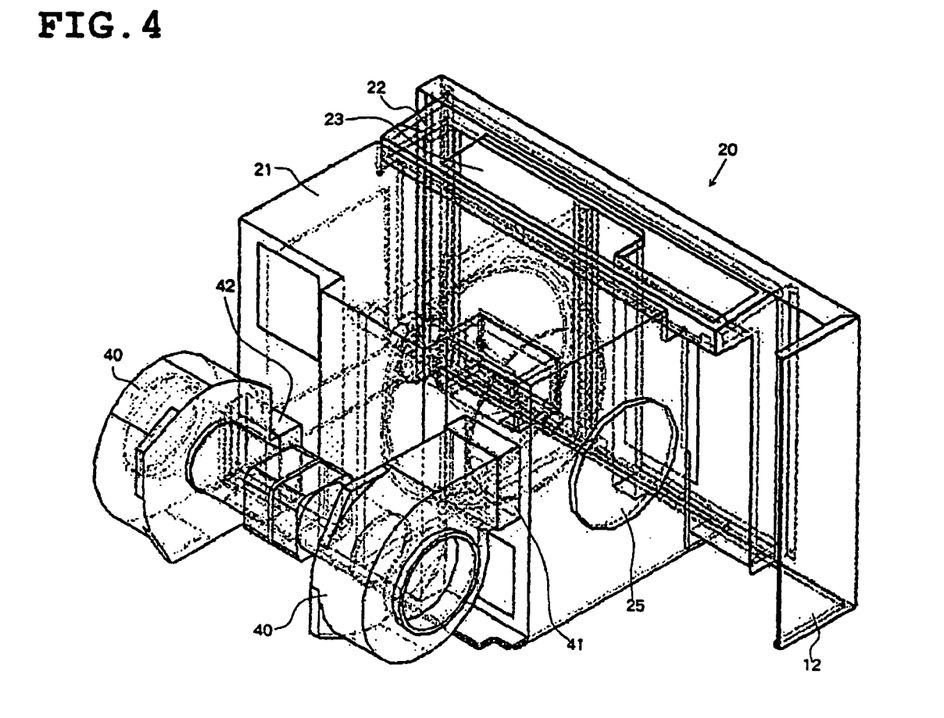
FIG. 4 is a partially exploded perspective view schematically illustrating a cooling structure according to the embodiment of the present invention, viewed from the side of a projection lens.

Referring to FIGS. 2-4, structure 20 for cooling a lamp is provided in housing 11 of projection display apparatus 1. Structure 20 is in contact with removable rear lid 12 on the back side of housing 11. Structure 20 comprises lamp house 21, lamp house cover 22, a pair of sirocco fans 40 that are arranged on the left and right sides, exhaust duct 23, and exhaust port 14 that is formed on the top of housing 11.

Lamp housing 21 houses xenon lamp 30. Lamp housing cover 22 is attached to rear lid 12, and comes into engagement with lamp house 21 when rear lid 12 is engaged with housing 11. The pair of sirocco fans 40 provided on the left and right sides supply cooling air into lamp house 21. Exhaust duct 23, which exhausts cooling air from the inside of lamp house 21 via openings which are formed on the left and right sides thereof, is integrated with lamp house cover 22. The outlet of exhaust duct 23 is in communication with exhaust port 14 formed on the top of housing 11.

Although lamp house cover 22 is fixed to rear lid 12 in this exemplary embodiment, the present invention can also be applied to a structure in which lamp house cover 22 is not fixed to rear lid 12. In this modified embodiment, the lamp house is opened by removing the rear lid, and then, by removing the lamp house cover.

When rear lid 12 is removed from housing 11, lamp house cover 22 that is fixed to rear lid 12 is removed from lamp house 21 together with exhaust duct 23. As a result, the backside of lamp house 21 is entirely opened, and the interior of lamp house 21 is exposed. Lamp housing 21 can then be pulled out from housing 11 of projection display apparatus 1. Since the backside of lamp house 21 is completely exposed by pulling out lamp house 21, xenon lamp 30 can be safely replaced with a new one. Even if lamp house 21 is not pulled out, xenon lamp 30 can be safely replaced, because the backside of the lamp house is fully exposed, and sufficient working space is ensured.

Figure 5:
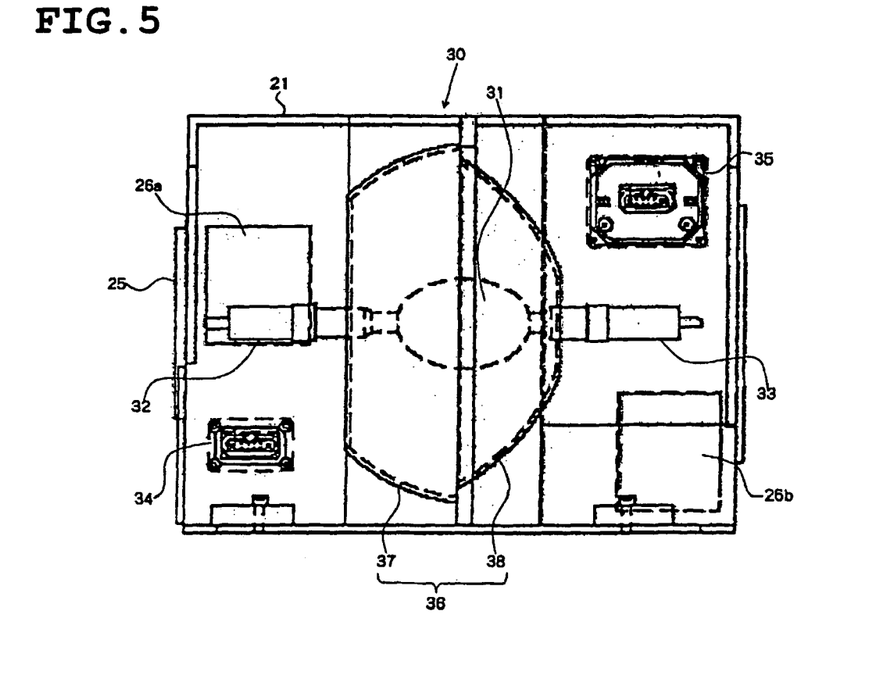
FIG. 5 is a schematic side view illustrating the interior of the lamp house for housing a xenon lamp having a structure for cooling a lamp according to the embodiment of the present invention.

As illustrated in FIG. 4, discharge ports of two sirocco fans 40 are connected to intake port 41 on the right side, or on the side of the anode, and to intake port 42 on the left side, or on the side of the cathode, respectively. Intake port 41, 42 are provided on the surface of lamp house 21 that is in a direction that is away from lamp house cover 22. As illustrated, since intake port 41 and intake port 42 are located at different elevations, the interior of lamp house 21 is uniformly cooled with regard to the vertical direction. In lamp house 21, anode 32 and cathode 33, which interpose double reflector 36 that surrounds bulb 31 of xenon lamp 30 therebetween, are provided at locations that correspond to intake port 41 and intake port 42, respectively, as illustrated in FIG. 5. Anode 32 and cathode 33 are cooled by cooling air that is supplied from intake port 41 and intake port 42, respectively. Cooling air is exhausted to the outside from exhaust port 14 via exhaust duct 23 that is integrated with lamp house cover 22 after cooling the lamp. The flow rate of the cooling air that is supplied by sirocco fans 40 can be adjusted by controlling the rotational speed of each fan independently, and thereby, the cooling temperature for anode 32 and cathode 33 can be controlled independently. Although the flow rate is controlled by the rotational speed in this exemplary embodiment, it can also be controlled, for example, by using dampers disposed in the passage through which the cooling air travels, or by providing branches that connect to a single fan for supplying cooling air to both anode 32 and cathode 33.

As mentioned above, lamp house 21 is provided with intake ports 41, 42 for cooling air in the vicinity of anode 32 and cathode 33 of xenon lamp 30, respectively, and the flow rates of cooling air that pass through intake ports 41, 42 can be separately set to appropriate values by having the cooling air supplied through two sirocco fans 40, leading to an improved cooling efficiency. Although sirocco fans are employed in this exemplary embodiment, fans are not limited to this type and any type of fan, such as an axial fan, may be used, as long as it is capable of supplying cooling air with a predetermined flow rate and with a predetermined pressure.

Referring to FIG. 5, lamp house 21 houses xenon lamp 30. Lamp 30 has bulb 31 that serves as a light emitter, and a pair of anode 32 and cathode 33, which are connected to each side of bulb 31, respectively. Bulb 31 is surrounded by double reflector 36, which is comprised of circular reflector 37 that is arranged on the side of anode 32 and oval reflector 38 that is arranged on the side of cathode 33. Bulb 31 is fixed to lamp house 21 via double reflector 36. Explosion-proof glass 25 is provided on a side surface of lamp house 21 that faces anode 32. Light that is emitted from bulb 31 converges at double reflector 36, and is projected to the outside through explosion-proof glass 25. Electrode 34 for anode 32 and electrode 35 for cathode 33 are provided in lamp house 21.

Figure 6:
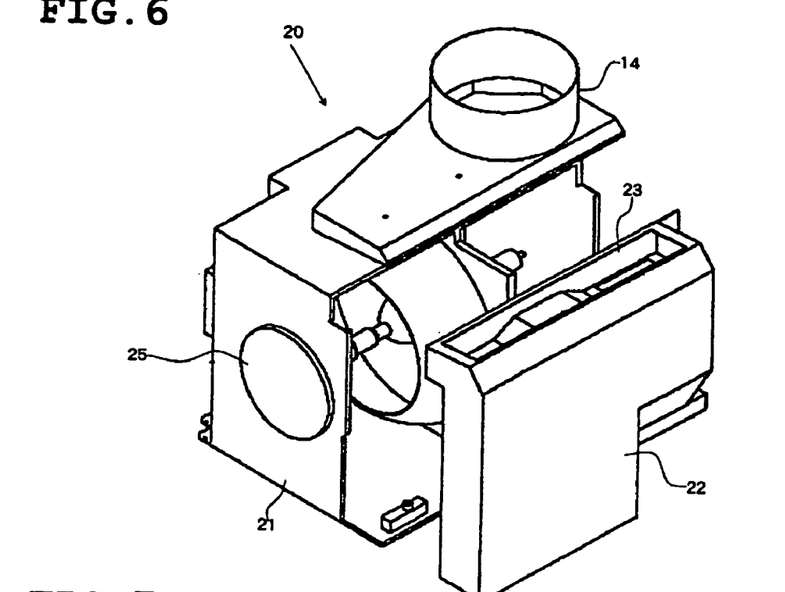
FIG. 6 is a partially exploded perspective view schematically illustrating the structure for cooling a lamp according to the embodiment of the present invention, viewed from the back side of the housing.

Referring to FIGS. 6-8B, exhaust duct 23 is integrated with lamp house cover 22. Exhaust duct 23 is comprised of exhaust duct portion 23a on the anode side, exhaust duct portion 23b on the cathode side, and connecting portion 24. Exhaust duct portion 23a on the anode side has duct opening 26a on the anode side, and exhaust duct portion 23b on the cathode side has duct opening 26b on the cathode side. Duct slopes 28 are provided to promote smooth flow of cooling air. Exhaust duct portion 23a on the anode side and exhaust duct portion 23b on the cathode side are arranged such that duct opening 26a on the anode side and duct opening 26b on the cathode side are on both sides of bulb 31 of xenon lamp 30, which is mounted in lamp house 21, such that duct openings 26a and 26b are located near the corresponding electrodes. In this way, one part of double reflector 36 is interposed between exhaust duct portions 23a and 23b of lamp house cover 22. Exhaust duct portion 23a on the anode side and exhaust duct portion 23b on the cathode side are joined at connecting portion 24 which is located in an upper area of lamp house cover 22. Cooling air that flows from connecting portion 24 is exhausted to the outside from exhaust port 14 via the skirt thereof that is formed on the top of housing 11 of projection display apparatus 1, as illustrated in FIG. 6.

Figure 7:
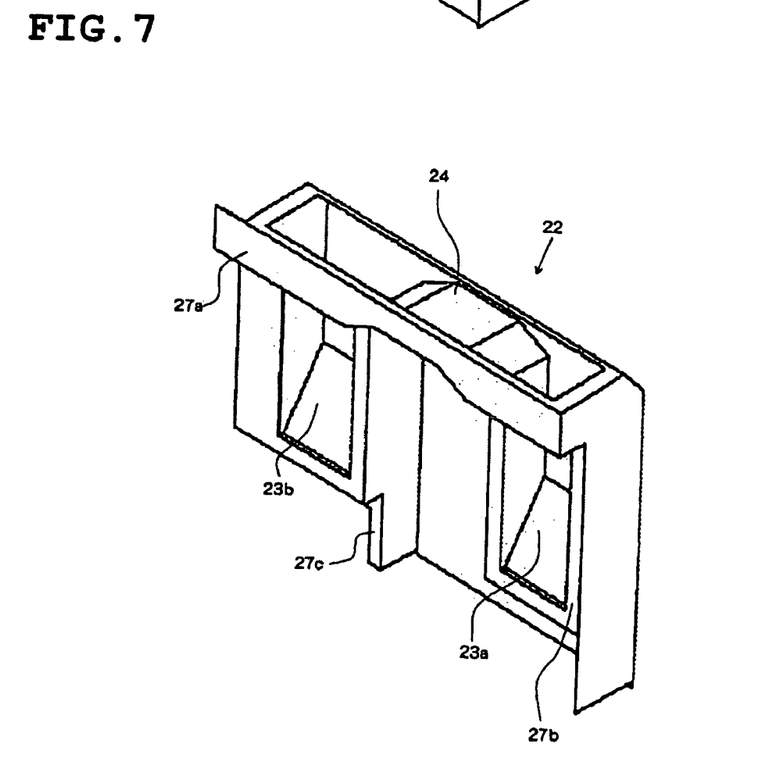
FIG. 7 is a schematic perspective view of a lamp house cover used for the structure for cooling a lamp according to the embodiment of the present invention.
Figure 8A:
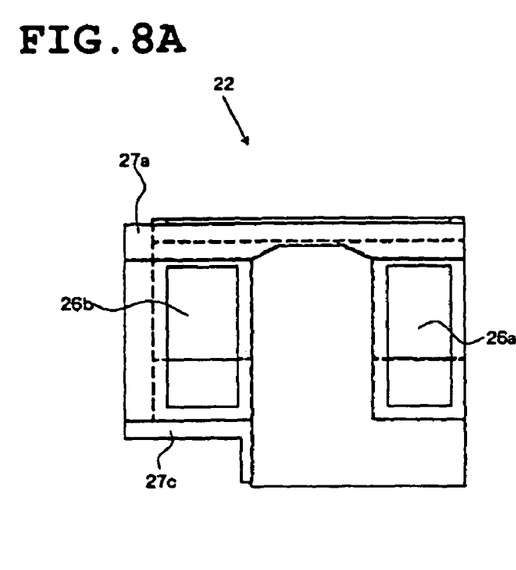
FIG. 8A is a front view of the lamp house cover used for the structure for cooling a lamp according to the embodiment of the present invention, viewed from the side of the lamp house.
Figure 8B:
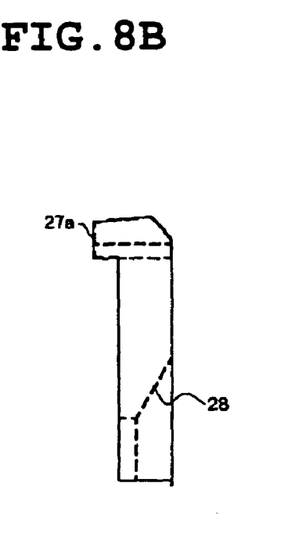
FIG. 8B is a schematic side view of the same.

Lamp house cover 22 is engaged with a side surface of lamp house 21 at contact surfaces 27a, 27b, 27c, as illustrated in FIGS. 7-8B, and the interior of lamp house 21 is isolated from the outside. Lamp house 21 can be opened by just pulling lamp house cover 22 apart.

In this exemplary embodiment, duct opening 26b on the cathode side has a larger area than duct opening 26a on the anode side, as illustrated in FIG. 8A, so that the cooling efficiency of bulb 31 can be enhanced, as will be later described.

Figure 9A:
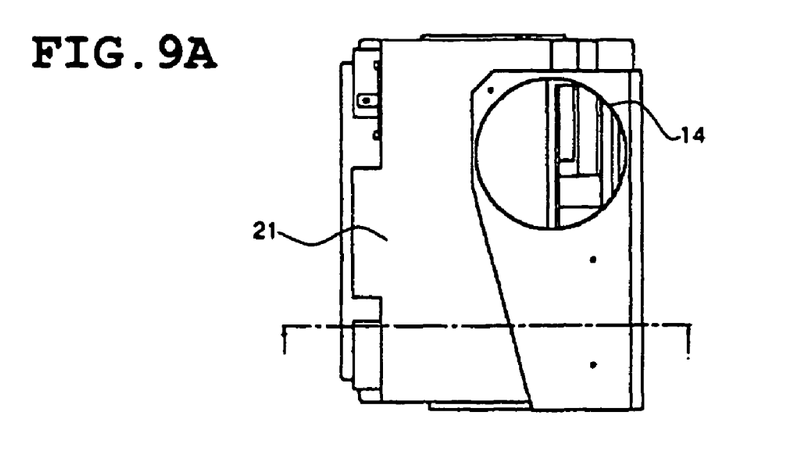
FIG. 9A is a top plan view.
Figure 9B:
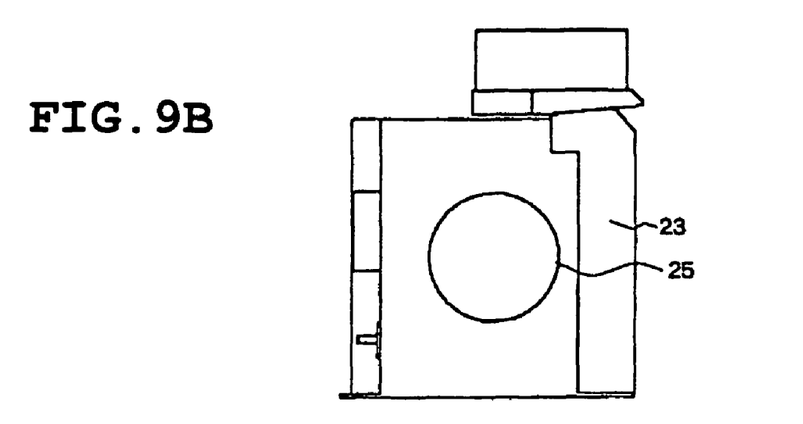
FIG. 9B is a side view.
Figure 9C:
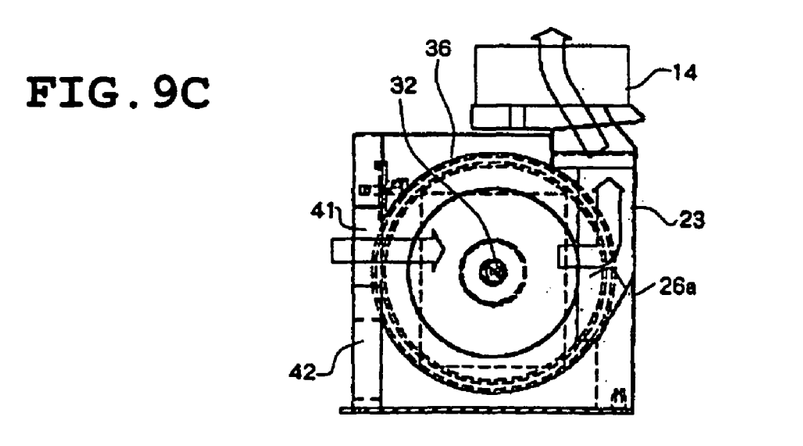
FIG. 9C is a side sectional view taken along section A-A.

As illustrated in FIG. 9, duct opening 26a on the anode side and duct opening 26b on the cathode side, not shown, have larger opening areas than intake ports 41, 42. Accordingly, cooling air that is supplied from sirocco fans 40, not shown, via intake ports 41, 42 is smoothly exhausted to exhaust duct 23 via duct opening 26a on the anode side and duct opening 26b on the cathode side without staying stagnant in lamp house 21, as indicated by the arrows in FIG. 9C, and a reduction in cooling efficiency that may be caused by stagnant cooling air is prevented. Inlet openings 26a, 26b of exhaust duct portions 23a, 23b are formed on exhaust ducts 23, which are arranged in lamp house cover 22, at the locations that correspond to intake ports 41, 42 for cooling air. Since duct opening 26a on the anode side and duct opening 26b on the cathode side are located near anode 32 and cathode 33, respectively, with double reflector 36 of lamp 30 being interposed therebetween, cooling air is exhausted from exhaust duct portions 23a, 23b without staying stagnant in lamp house 21, leading to an increase in cooling efficiency. This configuration enables exhaust duct portions 23a, 23b themselves to be accommodated in lamp house 21, which advantageously contributes to a reduction in the size of projection display apparatus 1.

Inlet openings 26a, 26b are located at locations that correspond to the locations of intake ports 41, 42, respectively. Therefore, cooling air that is fed from intake port 41 cools anode 32 of xenon lamp 30, and is exhausted via duct opening 26a on the anode side. Cooling air that is fed from intake port 42 cools cathode 33 of xenon lamp 30, and is exhausted via duct opening 26b on the cathode side. As a result, the amount of cooling air that flows around bulb 31 and double reflector 36, which are located between anode 32 and cathode 33, is limited. By forming duct openings 26a, 26b such that duct opening 26b has a larger opening area than duct opening 26a, as illustrated in FIG. 8A, a larger amount of cooling air is sucked from duct opening 26b on the cathode side than from duct opening 26a on the anode side. As indicated by the dotted arrows in FIG. 10, part of the cooling air that flows toward duct opening 26a on the anode side flows in the direction of duct opening 26b to cool bulb 31 and double reflector 36. Although cooling air flows from the anode side to the cathode side in this exemplary embodiment, cooling air may flow from the cathode side to the anode side by increasing the opening area of duct opening 26a on the anode side.

Figure 10:
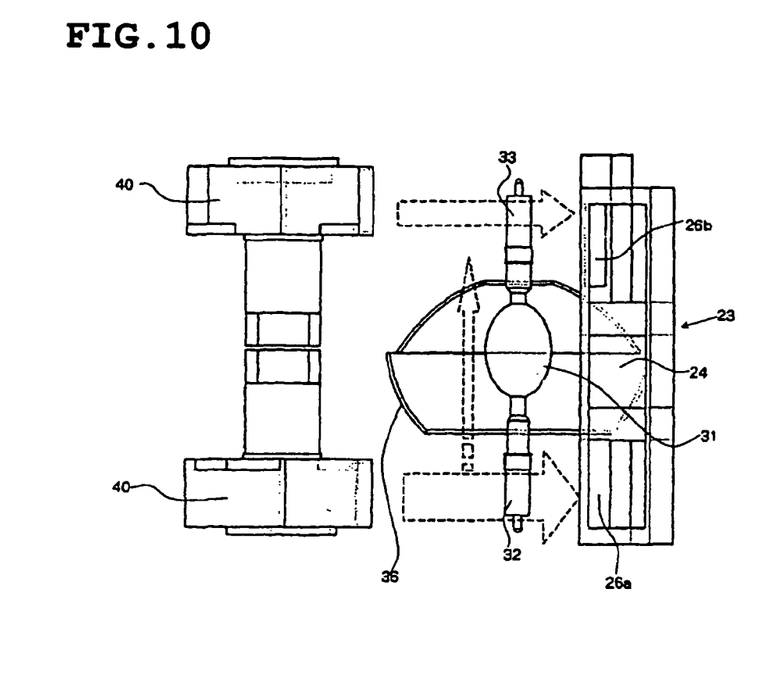
FIG. 10 is a schematic top plan view of the structure for cooling a lamp illustrating the flow of cooling air.

As described above, by forming two inlet openings 26a, 26b of exhaust duct portions 23a, 23b that have opening areas which are different from each other, a larger amount of cooling air is exhausted from the opening having a larger opening area. This structure has the advantage that bulb 31 can be cooled with a higher efficiency, because cooling air flows from the inlet opening that has a smaller opening area to the inlet opening that has a larger opening area via bulb 31 of lamp 30. Also, since the amount of cooling air that flows around bulb 31 can be controlled by changing the ratio of the opening areas, cooling efficiency can be advantageously increased as a whole.

Although a certain preferred embodiment of the present invention has been shown and described in detail, it should be understood that various changes and modifications may be made without departing from the spirit or scope of the appended claims.

What is claimed is:

1. A structure for cooling a lamp used for a projection type display apparatus, said structure comprising:
    a lamp house for housing a lamp that is operable as a light source, said lamp house being configured to be installed in a housing of said projection display apparatus, said structure consisting of a fan for supplying cooling air into said lamp house,
    wherein said lamp house comprises a removable lamp house cover, said fan and said removable lamp house cover being placed on opposite sides of said lamp,
    wherein an exhaust duct for said cooling air is integrated with said lamp house cover, said cooling air exiting to outside of the display apparatus from said lamp house cover,
    wherein said lamp comprises a bulb, a cathode, and an anode, said cathode and said anode being located on both sides of said bulb, respectively,
    wherein said lamp house has a pair of intake ports for receiving cooling air from said fan, wherein said intake ports are formed at locations on a side surface of said lamp house, said side surface being in a direction facing away from said lamp house cover, wherein said locations are different in elevation and face said cathode and said anode, respectively;
    wherein said exhaust duct has a pair of openings as inlets of said exhaust duct, said openings being formed at locations which correspond to said cathode and said anode, respectively, and
    wherein said housing has an exhaust port for said cooling air, said exhaust port being formed near an outlet opening of said exhaust duct.

2. The structure according to claim 1, wherein said bulb is provided with a double reflector which surrounds said bulb,
    wherein said exhaust duct comprises:
        a pair of duct portions each having an inlet opening; and
        a connecting portion for connecting said duct portions, wherein said connecting portion is arranged above said duct portions, and
    wherein, said inlet openings are arranged on both sides of said double reflector of said lamp, said inlet openings being opposite to said cathode and said anode, respectively.

3. The structure according to claim 2, wherein said inlet openings of said duct portions have opening areas which are different from each other.

4. The structure according to claim 3, wherein said inlet opening which is opposite to said cathode has a larger opening area than said inlet opening which is opposite to said anode.

5. The structure according to claim 1, wherein said lamp comprises a xenon lamp.

6. The structure according to claim 1, wherein said lamp house cover is fixed to a removable lid which constitutes a back surface of said housing of said projection display apparatus, and said lamp house cover is configured to be engaged with said lamp house when said lid is engaged to said housing.

7. A projection display apparatus comprising the structure according to claim 1.

8. The structure according to claim 1, wherein the fan is placed on a side surface of the lamp house,
    wherein said lamp house extends from said side surface of the lamp house to the lamp house cover, and
    wherein said side surface is placed directly and completely opposite from the lamp house cover.

9. The structure according to claim 1, wherein said fan is placed on a side surface of the lamp house which is parallel to a rear lid of said projection type display apparatus, said rear lid holding said lamp house cover.

10. The structure according to claim 1, wherein said lamp house cover extends in a direction parallel to a weight direction of said display device.

11. The structure according to claim 1, wherein the fan supplies the cooling air into the lamp house substantially in a perpendicular direction to a weight direction of the display device.

12. The structure according to claim 11, wherein the exhaust duct exits the cooling air from said lamp house cover substantially in the weight direction of the display device.

13. The structure according to claim 1, wherein the lamp house cover engages with the lamp house such that by removing the lamp house cover, an interior of the lamp house including the lamp is exposed.

14. A structure for cooling a lamp of a projection type display apparatus, said structure comprising:
    a lamp house for housing a lamp, said lamp house being installed in a housing of said projection type display apparatus, said lamp house comprising a removable lamp house cover said structure consisting of a pair of fans for supplying cooling air into said lamp house, said pair of fans and said removable lamp house cover being placed on opposite sides of said lamp; and
    a rear lid of said projection type display apparatus for engaging the lamp house cover with said lamp house,
    wherein an exhaust duct for exhausting said cooling air is integrated with said lamp house cover such that the cooling air exits to outside of said projection type display apparatus from said lamp house cover,
    wherein said pair of fans are placed on a side surface of the lamp house which is parallel to the rear lid of said projection type display apparatus, said rear lid holding said lamp house cover, and
    wherein said exhaust duct has a pair of openings as inlets of said exhaust duct.

15. The structure according to claim 14, wherein said lamp house extends from said side surface of the lamp house to the lamp house cover, and
    wherein said side surface of the lamp house is placed directly and completely opposite from the lamp house cover.

16. The structure according to claim 14, wherein the pair of fans supply the cooling air to the lamp house substantially in a perpendicular direction to the weight direction of the display device, and
   wherein the exhaust duct exits the cooling air from said lamp house cover substantially in the weight direction of the display device.

17. The structure according to claim 14, wherein the lamp house cover engages with the lamp house such that by removing the lamp house cover, an interior of the lamp house including the lamp is exposed.

18. A structure for cooling a lamp of a projection type display apparatus, said structure comprising:
   a lamp house for housing a lamp, said lamp house being installed in a housing of said projection type display apparatus, said lamp house comprising a removable lamp house cover, said structure consisting of a fan for supplying cooling air into said lamp house, said fan and said removable lamp house cover being placed on opposite sides of said lamp; and
   a rear lid of said projection type display apparatus for engaging the lamp house cover with said lamp house,
   wherein at least one exhaust duct for exhausting said cooling air is integrated with said lamp house cover such that the cooling air exits to outside of said projection type display apparatus from said lamp house cover,
   wherein said fan is placed on a side surface of the lamp house which is parallel to the rear lid of said projection type display apparatus, said rear lid holding said lamp house cover,
   wherein said lamp house extends from said side surface of the lamp house to the lamp house cover,
   wherein said side surface of the lamp house is placed directly and completely opposite from the lamp house cover,
   wherein the fan supplies the cooling air into the lamp house substantially in a perpendicular direction to the weight direction of the display device,
   wherein the at least one exhaust duct exits the cooling air from said lamp house cover substantially in the weight direction of the display device,
   wherein the lamp house cover engages with the lamp house such that by removing the lamp house cover, an interior of the lamp house including the lamp is exposed, and
   wherein said exhaust duct has a pair of openings as inlets of said exhaust duct.

* * * * *